No. 764,439. PATENTED JULY 5, 1904.
A. C. EASTWOOD.
CONTROLLING SYSTEM FOR ELECTRIC MOTORS.
APPLICATION FILED MAR. 21, 1904.
NO MODEL. 5 SHEETS—SHEET 5.

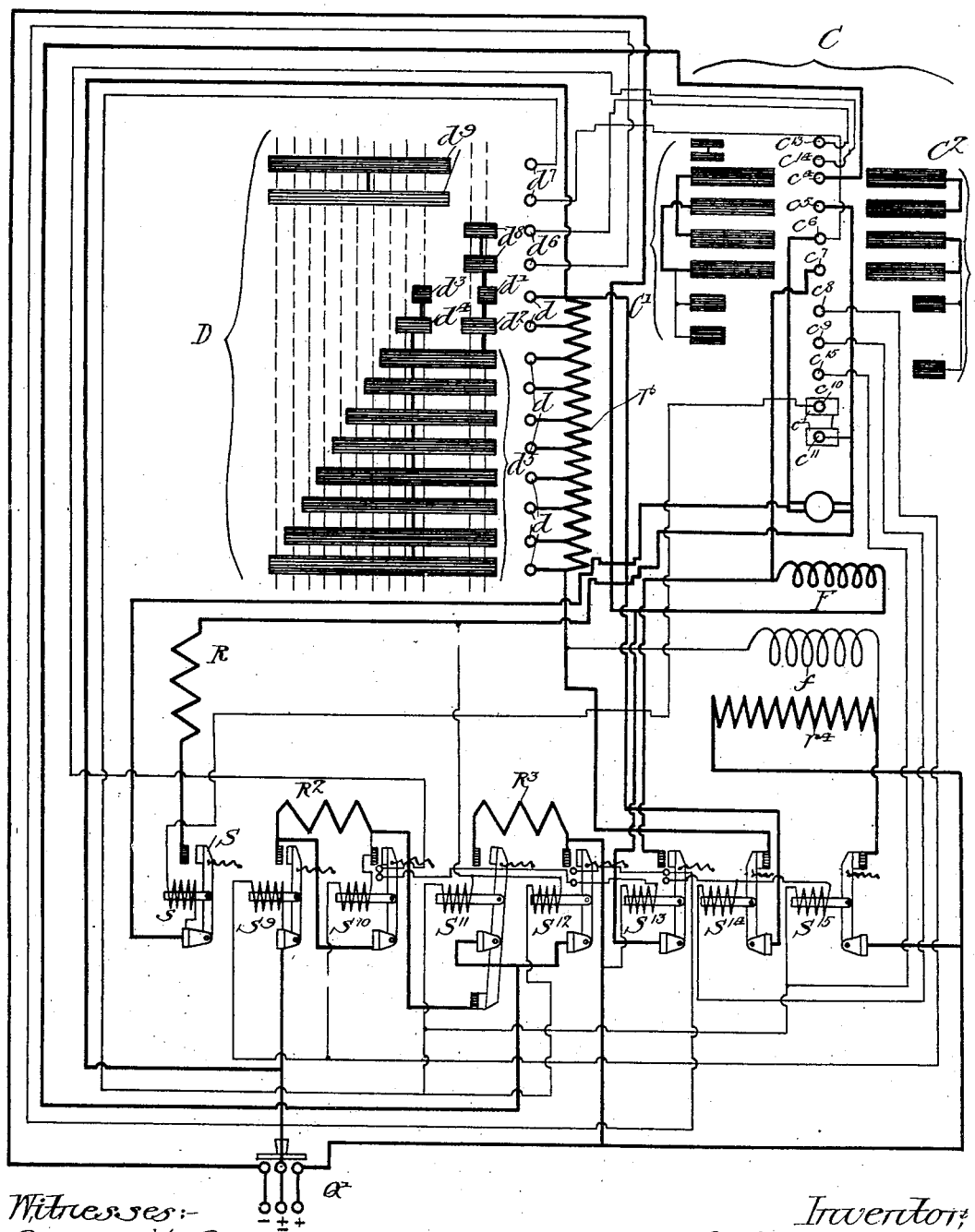

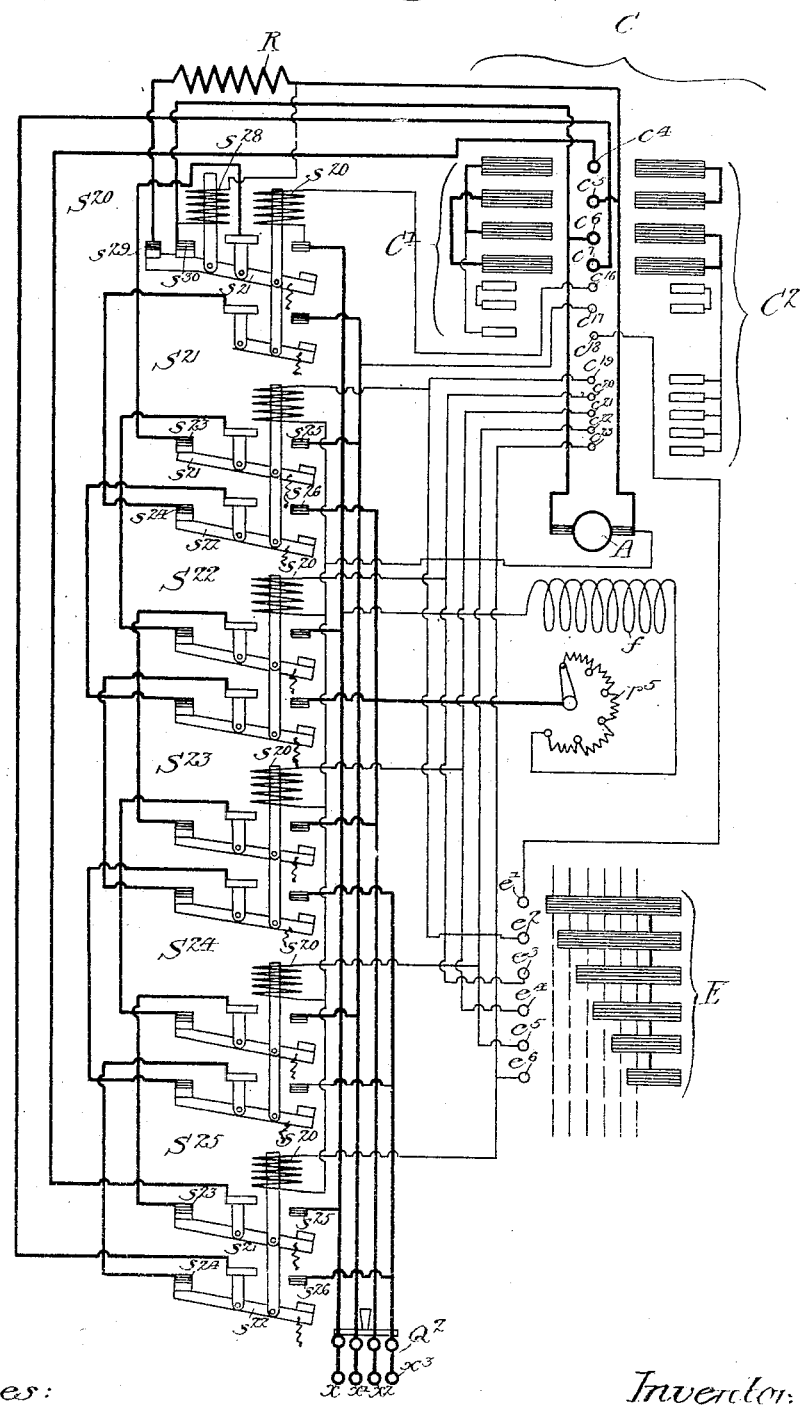

Witnesses:-
Wesley H. Reel
Titus H. Fors

Inventor:
Arthur C. Eastwood,
by his Attorneys,
Howson & Howson

No. 764,439. Patented July 5, 1904.

UNITED STATES PATENT OFFICE.

ARTHUR C. EASTWOOD, OF CLEVELAND, OHIO.

CONTROLLING SYSTEM FOR ELECTRIC MOTORS.

SPECIFICATION forming part of Letters Patent No. 764,439, dated July 5, 1904.

Application filed March 21, 1904. Serial No. 199,123. (No model.)

*To all whom it may concern:*

Be it known that I, ARTHUR C. EASTWOOD, a citizen of the United States, and a resident of Cleveland, Ohio, have invented certain Improvements in Controlling Systems for Electric Motors, of which the following is a specification.

My invention embraces a novel combination of apparatus for limiting the current flowing through a motor at the instant of its reversal to a value which the motor will safely stand, and also contemplates the use of means for automatically cutting out the starting resistance of the motor in such manner that the current flowing will not exceed a predetermined safe value.

The invention further includes reversing mechanism and adjustable means for regulating the speed of a motor such that when said means has been set for a certain speed the motor will be automatically reversed and accelerated to the predetermined speed, again reversed at a predetermined time and accelerated to a given speed in the reverse direction, and so on. The arrangement of parts is such that the speeds attained by the motor when operating in opposite directions may be and generally are different, since when the motor drives a reciprocating machine, such as a planer, a cut is generally made while the reciprocating part is moving in but one direction, and it is desirable to return said part on its idle stroke as rapidly as possible.

With the object of advantageously operating a motor in the manner indicated I have provided the system hereinafter described, reference being had to the accompanying drawings, in which—

Figure 1:
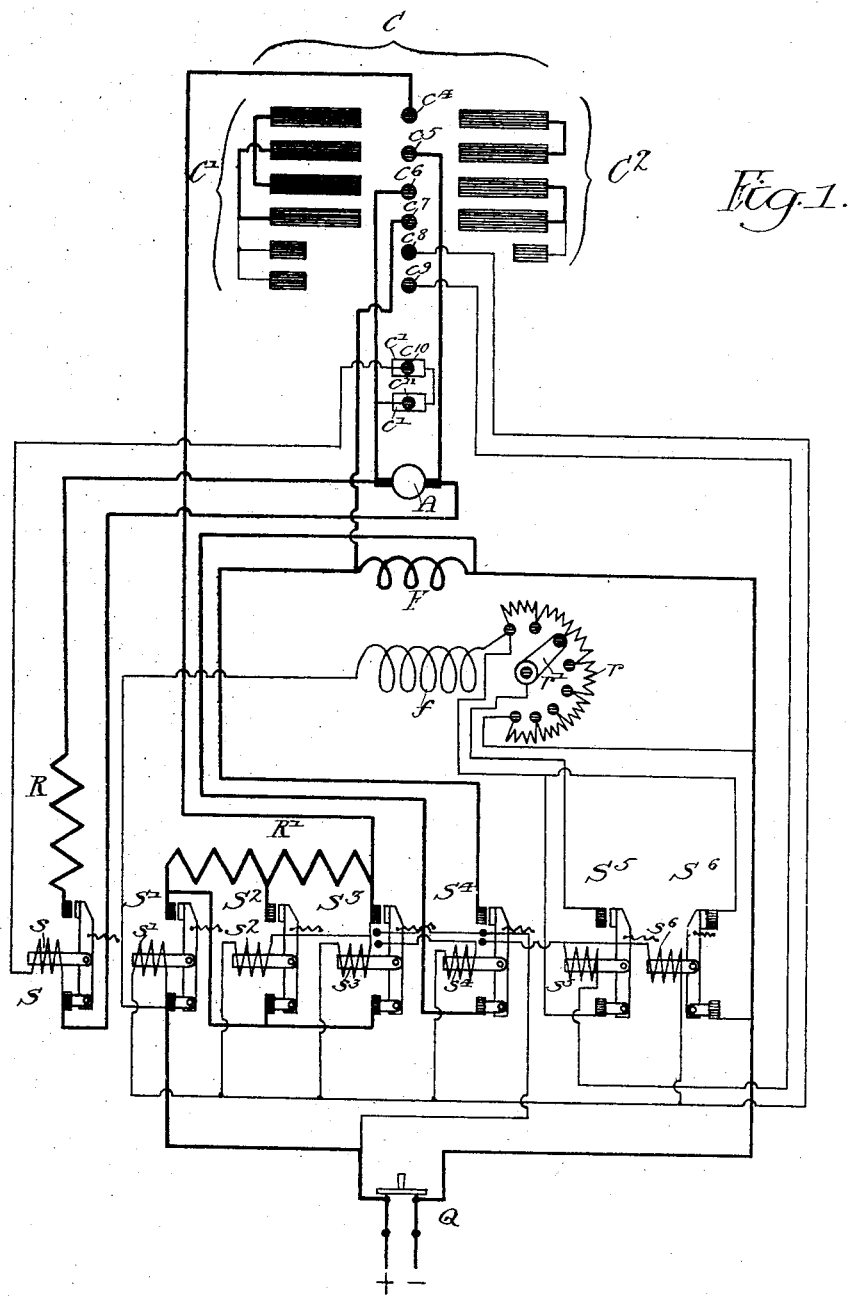
Figure 2:
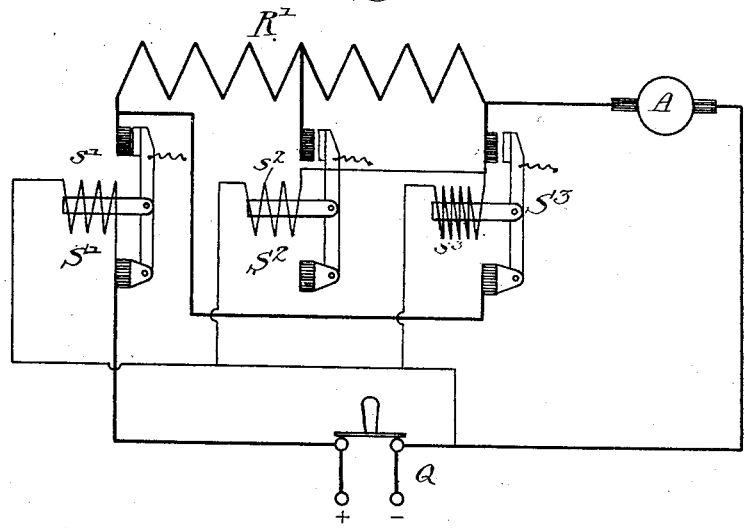
Figure 5:
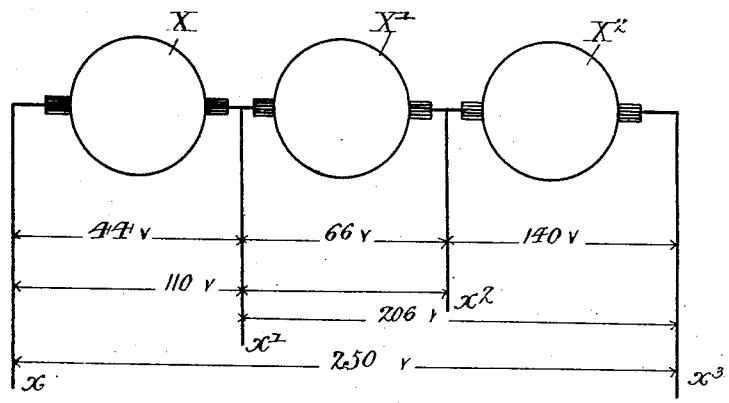
Figure 6:
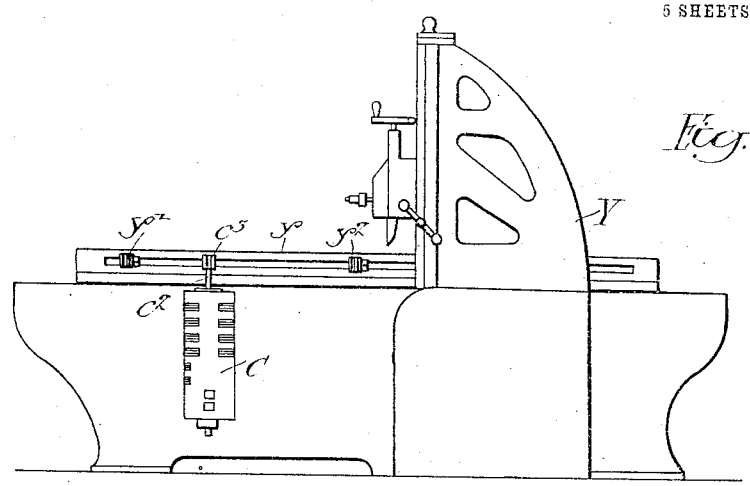
Figure 7:
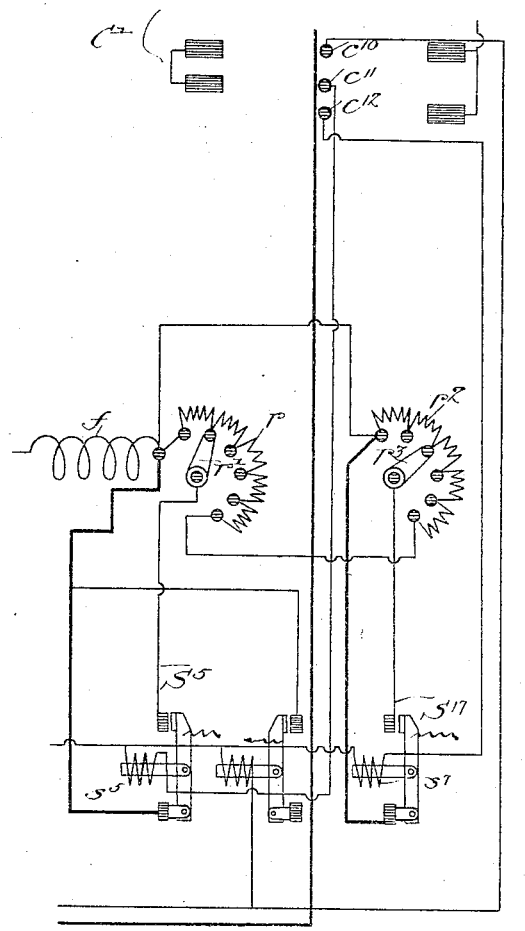

Figure 1 is a diagrammatic view showing my invention as applied to the automatic control of a compound-wound motor, the speed variation being obtained by adjusting a variable resistance in circuit with the shunt field-winding. Fig. 2 is a diagrammatic view illustrating the connections between the automatic switches, the starting resistance, and the armature of the motor illustrated in Fig. 1, the whole being shown for the sake of clearness as independent of the other connections. Fig. 3 is a diagrammatic view illustrating my invention as employed for the automatic control of a compound-wound motor, the speed variation being obtained by applying the two voltages of an Edison three-wire system to the armature of the motor in combination with both adjustable and non-adjustable resistance in the shunt field-winding of said motor. Fig. 4 is a diagrammatic view showing my invention as applied to the automatic control of a shunt-wound motor, the speed variation being obtained by supplying the armature of the motor with the various voltages of a four-wire circuit and in employing an adjustable resistance in the shunt field-winding. Fig. 5 is a diagrammatic view illustrating the distribution of voltages between the wires of the circuits supplying the apparatus illustrated in Fig. 4. Fig. 6 is a side elevation, to some extent diagrammatic, showing a planer equipped with a controller for reversing the motor from which said planer is driven; and Fig. 7 is a diagrammatic view of a special form of the system illustrated in Fig. 1.

Hitherto reciprocating machines—such as metal planers, for example—have been driven either by a pair of belts running in opposite directions and shifting alternately from tight to loose pulleys or through some form of clutch.

With the belt-drive there is ordinarily but a single cutting speed possible, which speed in general is too low for cutting cast-iron with maximum efficiency and too high for cutting steel without rapid depreciation of the cutting-tool.

With the clutch-drive a plurality of speeds has in some cases been secured by changing the gear ratio between the clutch which imparts the cutting motion to the platen of the planer and the driving-shaft of the planer. Such an arrangement is relatively costly, as well as complicated, and the range of speed secured is not sufficient to permit of the tool being worked at its maximum cutting efficiency on all materials operated upon in the ordinary run of machine-shop work. For this reason the metal-planer has in the past been one of the most inefficient of tools, and the same may be said of many other forms of reciprocating machines, such as various forms of printing-presses and the like.

By my invention I provide a system by means of which a driving-motor directly connected or geared to the platen of a planer or to the oscillating or reciprocating part of any machine can be reversed at each end of each stroke, at the same time providing means whereby the speed of said motor may be varied at will to give the most efficient cutting speed for the material operated upon. By such a system I dispense entirely with belts, which transmit power at a low efficiency and which deteriorate rapidly, and, moreover, secure the desired operation of the driven machine without the use of clutches or change-gears.

The problem of reversing a motor connected to a load may be resolved into two parts—first, the absorption and dissipation of the energy of the rotating armature and of the load to which it may be connected, due to their forward motion, and, second, the acceleration of the combined masses of the armature and the load in a reverse direction.

With the controlling devices at present known to the art the reversal of the current through one of the members of the motor while the armature is in motion causes a very heavy rush of current to take place through said armature, and this is not only injurious both to the windings and to the commutator, but in addition produces mechanical strains which may be injurious to the gearing and to the machine operated by the motor.

The abnormal current flowing after the direction of current-flow has been reversed and before the direction of rotation of the armature has been reversed is due to the fact that during the time intervening between these occurrences the counter electromotive force generated by the armature, due to its forward revolution, acts in the same direction as the newly-applied electromotive force, so that the total voltage active to force current through the windings of the motor may be nearly double the applied electromotive force.

In general I prefer to use a compound-wound motor in carrying out my invention, although, as hereinafter described, it is possible to advantageously employ a shunt-wound motor. A compound-wound motor will produce a greater torque at the instant of reversal on account of the effect of the relatively heavy series-field current and will therefore tend to accelerate a load more rapidly than would otherwise be the case. Since, however, such a motor has a tendency to reduce its speed under an increase in load and as variation in speed due to variation of load when making a working stroke is undesirable, I use the series field-winding only during the period of reversal and acceleration, thereafter short-circuiting said winding and continuing to operate the motor as a simple shunt-wound machine for the remainder of the working stroke.

For varying the speed of the motor where a very wide range is not required I may use a single applied voltage and adjust the speed by inserting more or less resistance in the shunt field-winding of the motor, while where a wider range of speed is required I may secure the desired variation by applying various voltages to the armature of the motor either with or without an adjustable resistance inserted in circuit with the shunt field-winding.

In the drawings and description following I have illustrated and described three cases to which my improved system of control may be adapted, although it will be understood that I do not limit myself solely to these particular applications, since it is possible to conceive of other combinations of apparatus by which the same end as that obtained by my invention would be secured, but which would simply be developments of the broad idea of said invention.

In Figs. 1 and 2 I have illustrated my improved system as adapted to the automatic control of a compound-wound motor whose speed of operation is adjusted by varying its field strength. Current is supplied from a pair of mains through a main switch Q, and the apparatus employed includes a controller C, having a drum actuated by the reciprocating part of the machine driven by the motor, whose armature is indicated at A. Said motor has a series field-winding F and a shunt field-winding $f$, there being a bank of resistance $r$ connected to one end of the latter. The amount of this resistance in circuit with the winding $f$ depends on the position of an adjustable contact-arm $r'$, which engages contact-buttons connected at intervals to the resistance $r$. I also employ seven electromagnetic switches S, S', to $S^6$, together with two banks of resistance R and R', connected as hereinafter set forth.

The drum of the controller C is illustrated in Fig. 6 as employed in connection with a metal-planer, illustrated diagrammatically at Y and provided with a reciprocable platen $y$, having adjustable dogs $y'$ and $y^2$. The spindle $c^2$ of the controller-drum has on it a ratchet or toothed wheel $c^3$ for engagement with said dogs, so that the drum will be turned to a predetermined extent when either of said dogs is brought into engagement with said wheel. The controller has upon it two sets of contact-segments C' and $C^2$, of which there are six in one set and five in the other, there being also six contact-fingers $c^4$, $c^5$, to $c^9$ for engagement with said segments. The segments C' and $C^2$ are electrically connected, as indicated, and it will be noted that the three segments placed to engage the fingers $c^8$ and $c^9$ are relatively short, being engaged by said fingers after and disengaged therefrom before the other contact-segments for a purpose set forth hereinafter.

The switches S, S', S², to S⁶ have solenoid-coils $s$, $s'$, $s^2$, to $s^6$, respectively, by which they are actuated, and the first five of them are normally held open by any desired means, while tending to close when their respective coils are excited. The switch S⁶ is normally retained in a closed position, being opened only when its coil $s^6$ is excited.

The lower terminal of the switch S is directly connected to one terminal of the armature A, while its upper terminal connects, through the bank of resistance R, with the other armature-terminal. One end of the coil $s$ of this switch connects to the lower terminal of the switch, while its other end is connected to a contact-finger $c^{10}$ on the controller C. A second contact-finger, $c^{11}$, is connected to the second terminal of the armature, and it will be noted that there are on the controller-barrel two electrically-connected contact-segments $c'$, placed so as to engage said fingers when the controller is in its "off" position. One terminal of the switch S' is directly connected to the positive supply-main through switch Q, while the other terminal of said switch—in the present case the upper one—is connected to one end of a bank of resistance R', as well as to the lower terminals of the switches S² and S³, respectively.

The coil $s'$ of the switch S' has one end connected directly to the positive supply-main and its other end connected to the finger $c^8$ of the controller, and it may be added that under operating conditions the engagement of the said finger with its corresponding contact-segments establishes connection from said coil to the negative supply-main. One end of each of the coils $s^2$ and $s^3$ is similarly connected to the finger $c^8$, and hence, as above noted, to one of the armature-terminals or to the negative supply-main, while the other end of each of these coils is connected to that end of the bank of resistance R opposite to the end connected to the switch S', and hence to the other armature-terminal. It will therefore be seen that with these connections the voltage applied to the coils $s^2$ and $s^3$ will be the line-voltage minus whatever drop there may be through the resistance R.'

The switch S⁴ has its terminals connected, respectively, with the terminals of the series field-winding F of the motor, so that when said switch is closed said winding will be short-circuited. One end of the coil $s^4$, as well as the coil $s^6$ of the switch S⁶, is connected to the negative supply-main in a manner similar to the connection for the coils $s'$, $s^2$, and $s^3$, while its other end is connected to one of two auxiliary terminals on the switch S³, the second of said auxiliary terminals being in direct connection with the positive supply-main.

The switch S⁵ is connected to short-circuit any portion of the field resistance $r$ which may be included between the button engaged by the contact-arm $r'$ and the junction of said resistance with the shunt field-winding $f$. One end of the coil $s^5$ of this switch, as well as one end of the coil $s^6$, is connected to one of two auxiliary terminals on switch S⁴, the second auxiliary terminal being connected to the positive supply-main, it being noted that the two pairs of auxiliary terminals on the switches S³ and S⁴ are placed so as to be respectively connected by the blades of said switches when the latter close. The second end of the coil $s^5$ is connected to the finger $c^9$ of the controller C, and when the drum of said controller is turned to engage the set of segments indicated by C' said coil is connected to the negative supply-main. When, however, the drum is turned in the opposite direction, said coil is open-circuited, since there is no segment to engage said finger.

The switch S⁶ has one of its terminals connected directly to the negative supply-main and the other to the point of junction of the shunt field-winding $f$ and the resistance $r$, the opposite end of said resistance being also connected to the negative supply-main, so that the switch S⁶ when closed short-circuits said resistance.

Under operating conditions the main switch Q is closed and the drum of the controller turned so as to bring one set of contact-segments—for example, the set C'—into engagement with the fingers $c^4$ to $c^9$. This corresponds to such a direction of rotation of the motor as will cause the movable motion of the machine to make a working stroke.

With connections as above indicated, coil $s'$ of the switch S' will be excited, and said switch will at once be closed, thus closing the circuit through the motor and starting the same, it being noted that current flows through all of the resistance R' and the series field F of the motor. The shunt-field $f$, having one of its terminals connected to the positive supply-main and its other terminal connected, through the normally closed switch S⁶, to the negative supply-main, will also be excited.

The resistance R' is connected to the upper terminals of the switches S', S², and S³ and is divided into two sections, each having a resistance of five ohms. The total bank of resistance R' has therefore a resistance of ten ohms, and in the particular case referred to the switch S² has its coil so adjusted that the latter will operate to close said switch when current at a pressure of 73.4 volts is applied to it. Similarly the coil of the switch S³ is adjusted to close said switch when current at 146.8 volts is applied to it. Assuming that current supplied is at a pressure of two hundred and twenty volts, as soon as the switch S' is closed the current flowing will be two hundred and twenty divided by ten, or twenty-two amperes, and practically the full-line voltage will at first be absorbed by the resistance R', so that there will be no difference of potential between the ends of the coils $s^2$ and $s^3$. As soon, however, as the armature of the motor begins to revolve the current flowing will be reduced owing to the counter electromotive force set up by the armature, and this reduction continues until when current flowing is 14.66 amperes the drop through the resistance R' is 146.6 volts. Hence the voltage applied to the coils $s^2$ and $s^3$ will be two hundred and twenty minus 146.6, or 73.4 volts, under which condition the switch $S^2$ will immediately close and short-circuit one of the sections of said resistance R'. This will momentarily increase the volume of current flowing, and consequently speed up the motor. When, owing to the increased counter electromotive force the current has again fallen to 14.66 amperes, the drop through the second section of resistance R' will be 73.2 volts, so that the voltage applied to the coil $s^3$ will be 146.8 volts. The switch $S^3$ will therefore close, and thus short-circuit the second section of the resistance R'.

In the above assumption 14.66 amperes is taken as the normal running current of the motor, while the initial current of twenty-two amperes represents a fifty-per-cent. overload on the same motor. It will consequently be noted that the said initial current is limited to a safe value.

The closing of the switch $S^3$, by which current is permitted to flow directly to the motor from the supply-mains, also completes the circuit between the auxiliary terminals carried upon it, so that the coil $s^4$ is energized and the switch $S^4$ is closed, with the result that the series field-winding of the motor is short-circuited. Since such action weakens the field of the motor, its speed will be increased, and inasmuch as the closing of the switch $S^4$ has electrically connected the auxiliary contacts carried by it both of the coils $s^5$ and $s^6$ will now be excited, thus closing the switch $S^5$ and opening the switch $S^6$. The first of these switches acts to short-circuit whatever resistance is included between the junction of the shunt field-winding $f$ and the contact-button engaged by the adjustable arm $r'$, while the opening of the switch $S^6$ will remove the short-circuit from the resistance $r$, so that the field of the motor is still further weakened by an amount depending upon the quantity of resistance included between the button engaged by the arm $r'$ and the end of said resistance which is directly connected to the negative supply-main.

From the above it will be seen that there are as many speeds available as there are contact-buttons to the bank of resistance $r$, and since the various operations described take place in a relatively short time it will be seen that the motor is automatically brought up to any of the said speeds, which, as before noted, depend upon the amount of resistance in circuit with the shunt field-winding. When the end of the working stroke of the machine operated is reached, the barrel of the controller will be automatically turned by the engagement of the dog $y$ with the toothed wheel $c^3$, and the contact-fingers $c^4$ to $c^9$ break connection with the set of contacts C'. Since the contacts engaged by the fingers $c^8$ and $c^9$ are shorter than the main contacts, it will be noted that any arcing which may occur will take place on the switches S', $S^2$, $S^3$, to $S^6$ instead of on the contacts of the controller, inasmuch as said switches will open and cut off the current before the main contacts are disengaged by the fingers $c^4$ to $c^7$, inclusive.

While in moving from engagement with the segments C' to engagement with the segments $C^2$ the fingers $c^{10}$ and $c^{11}$ have engaged for a short time with the electrically-connected segments $c'$, such engagement is not continued for a sufficiently long interval to cause the coil $s$ to operate the switch S.

When the segments $C^2$ are brought into engagement with the fingers of the controller, the switch S' will again automatically close and the circuit will again be closed, with the direction of current through the armature reversed. The energy contained in the armature and its connected mechanism due to their forward motion will be dissipated through the resistance R', and the armature after being brought to rest will begin rotation in a direction the reverse of that hitherto noted.

As before, the switches $S^2$ and $S^3$ will close at predetermined times after the closing of the switch S', cutting out the resistance R', after which the switch $S^4$ will close, again short-circuiting the series field-winding. The switch $S^5$ will not close, since its coil has been open-circuited owing to there being no segment in the set $C^2$ which will engage the finger $c^9$. The switch $S^6$ will finally open, again removing the short circuit from the field resistance $r$. Under such conditions the entire body of this resistance $r$ is effectual in cutting down the field-current, and the armature of the motor will be accelerated to its maximum speed. At the end of the idle stroke of the machine the drum of the controller will be turned to its original position and the first cycle of operations will be again repeated.

If the controller at any time be thrown to its "off" position with the fingers $c^4$ and $c^9$ out of engagement with their contact-segments, the fingers $c^{10}$ and $c^{11}$ will engage with the segments $c'$, and since the armature of the motor will still be rotating the coil $s$ of the switch S will be excited by the counter electromotive force of said armature. This will close the switch S, so as to establish a circuit including the armature A and the bank of resistance R, which latter is preferably so proportioned that the maximum counter electromotive force of the motor will produce in it a current equal to the full-load current. The generation of this current produces a powerful braking action on the armature, and consequently on the machine to which it is connected, thereby quickly bringing them to rest. When this condition is attained, there is no further counter electromotive force generated, so that the coil $s$ is deënergized and the switch S is permitted to open. As above noted, this braking action takes place only when the controller remains in its off position for an appreciable time, since under ordinary conditions of automatic operation the segments $c'$ pass under the fingers $c^{10}$ and $c^{11}$ so rapidly that the coil $s$ has not time to act.

It will be understood from the above description that by my system a motor may be operated at any of a large number of speeds in one direction, automatically reversed, and then accelerated to a maximum speed in a reverse direction.

While the above-described system of operation is particularly applicable to a majority of machines, such as metal-planers, in which a slow-speed working stroke and a quick return stroke is desired, I do not limit myself in this particular, as it will be readily appreciated by those skilled in the art that similar means may be employed to adjust the speed of the motor for both strokes of the machine operated. Such a modification of my system is illustrated in Fig. 7, in which a contact-segment has been added to the set $C^2$ and a contact-finger $c^{12}$ employed in addition to those already provided. With such an arrangement of parts a second bank of resistance $r^2$ could be employed having contact-buttons and an adjustable arm $r^3$. There would also be a normally open switch $S^7$, having an operating-coil $s^7$, of which one end will be connected to the contact-finger $c^{10}$ of the controller C, while the other end of said coil would, like the coils $s^5$ and $s^6$, be connected to one of the auxiliary terminals of the switch $S^4$. Under operating conditions the amount of resistance $r^2$ in circuit with the field-winding $f$ could be adjusted independently of the resistance $r$, so as to obtain any desired speed of operation of the motor on its return stroke.

In Fig. 3 is shown my invention as applied to a compound-wound motor supplied with current from an Edison three-wire system, the speed variation being obtained by applying one of the two available voltages to the armature, with or without resistance, and also by adjusting the amount of resistance in circuit with the shunt field-winding of the motor. In this diagram Q' illustrates the main switch interposed between the positive, neutral, and negative supply-mains and the controlling system. In place of the adjustable contact-arm and contact-buttons connected at intervals to the resistance $r$ I provide in the present case a series of contact-fingers connected directly to said resistance and provide also a series of segmental contact-pieces $d'$, $d^2$, $d^3$, $d^4$, and $d^5$, mounted upon a drum in the well-known manner. In addition to said fingers there are other fingers $d^6$ and $d^7$, mounted so as to coact with segments $d^8$ and $d^9$, and it will be seen that all of the segments on said drum are in electrical connection, with the exception of the two indicated by the reference-letter $d^9$, which are, however, independently connected to each other. As in the system illustrated in Fig. 1, there is a controller C, actuated by the machine operated as before explained, while the controller D, having the resistance $r$, can be operated by hand, so as to bring any of its various segments into engagement with the contact-fingers $d$, $d^6$, and $d^7$. The controller has, in addition to the fingers and contact-segments described in the first form of my invention, other fingers $c^{13}$ and $c^{14}$, provided with two electrically-connected segments on the controller-barrel for a purpose hereinafter set forth. There is also a finger $c^5$ and a corresponding segment on the barrel, placed so as to be one of the set of contacts $C^2$ and in electrical connection with the segments engaged by the fingers $c^6$ and $c^7$. As before, there is a magnetically-operated switch S connected across the armature-terminals and having in circuit with it a body of resistance R, the coil $s$ of said switch being connected, as previously described, so as to be energized by the armature-current when the controller C remains in its off position for an appreciable time. The negative supply-main is connected to one end of the series field-winding F, while the neutral main is connected to the lower terminal of a switch $S^9$, and the positive main is connected to the upper terminal of a switch $S^{12}$. In addition to the above there are other switches $S^{10}$, $S^{11}$, $S^{13}$, $S^{14}$, and $S^{15}$, of which the switch $S^{11}$ is double-acting, there being contacts on both the upper and the lower ends of its switch-bar and corresponding terminals for the same. This switch is normally held with the lower end of its bar in engagement with the lowermost of these terminals. The banks of resistance $R^2$ and $R^3$ are connected, respectively, between the upper terminals of switches $S^9$ and $S^{10}$ and $S^{11}$ and $S^{12}$, and the upper contact of switch $S^{10}$ is also connected to the lowermost contact of the switch $S^{11}$, while the uppermost contact of the switch $S^{12}$ is connected to the positive supply-main. The upper terminal of the switch $S^9$ is connected to the lower terminal of the switch $S^{10}$, while the lower terminals of the switches $S^{11}$ and $S^{12}$ are connected together and to the finger $c^4$ of the controller C. The terminals of the switch $S^{13}$ are connected, similarly to those of the switch $S^4$, referred to in the first case described, to the terminals of the series field-winding F, while the terminals of the switch $S^{14}$ are connected to the bank of resistance $r$, so that this switch while in its normally closed position short-circuits said resistance.

Switch $S^{15}$, which is also normally closed, is connected to short-circuit a second bank of field resistance $r^4$. There are upon switch $S^{10}$ a pair of auxiliary terminals electrically connected when said switch is closed, one of these contacts being connected to the finger $c^{14}$ of the controller C, while the other is connected to an auxiliary terminal of the switch $S^{12}$ and to one end of the solenoid-coil of the switch $S^{13}$. The second auxiliary terminal on the switch $S^{12}$ is in turn connected to an auxiliary terminal on the switch $S^{13}$ and to one of the fingers $d^6$ on the controller D. The second auxiliary terminal on the switch $S^{13}$ is connected to one end of each of the solenoid-coils of the switches $S^{14}$ and $S^{15}$. With the various connections shown in the diagram and assuming that the controller D is on its first point the operations occurring when the switch Q' is closed will be as follows, it being assumed, moreover, that the drum of the controller C is moved so that the segments C' are engaged by the fingers thereof. With this condition existing the coil of the switch $S^9$ will at once cause said switch to close, thus supplying the armature of the motor with current at one hundred and ten volts, which will flow from the neutral supply-main through the resistance $R^2$ to the lowermost terminal of switch $S^{11}$ and thence to its center contact through the controller C, the armature of the motor, the series field-winding F, and the negative supply-main. When, as in the first case described, the current has been sufficiently reduced by the counter electromotive force of the armature, the switch $S^{10}$ will automatically close so as to short-circuit the resistance $R^2$, and thus still further increase the speed of the armature. Since both of the coils of switches $S^{11}$ and $S^{12}$ are open-circuited at the controller D, neither of them will close, although switch $S^{13}$ will be operated immediately after the operation of switch $S^{10}$ on account of the energization of its coil by current flowing through the auxiliary terminals on the switch $S^{10}$ and through the fingers $c^{13}$ and $c^{14}$ and the corresponding segments on the controller C. The circuit of this coil also includes finger $d^6$ and contacts $d^8$ on the controller D for a purpose set forth hereinafter. The closing of the switch $S^{13}$ will, as before, short-circuit the series field-winding of the motor and will cause a further increase in the speed of the armature. Switch $S^{14}$ will now open; but this will have no effect, since the entire bank of resistance $r$ is short-circuited by the contact-fingers and segments of the controller D. Under these conditions the motor will be operating with a full shunt field and its armature supplied with current at one hundred and ten volts, which condition will continue until the controller C is automatically reversed by the mechanism to which it is attached and the segments $C^2$ of said controller are brought into engagement with its fingers.

Such reversal causes all of the switches $S^9$ to $S$ to successively open and the switch $S^{14}$ to close, while the armature connections are reversed, so as to cause a reversal of its direction of rotation. When the switch $S^9$ closes and establishes the circuit to the motor, the inertia of the armature of the motor with its attached load due to their forward motion will be gradually dissipated as heat in the resistance $R^2$. The armature will then begin to revolve in the opposite direction, and the switch $S^{10}$ will close when the current has fallen to the predetermined volume. Since there is no segment in the set of segments $C^2$ corresponding to the fingers $c^{13}$ and $c^{14}$, the auxiliary terminals on the switch $S^{10}$ are inoperative, so that when the counter electromotive force of the motor has reached any predetermined point—as, for example, ninety volts—the coil of the switch $S^{11}$ will be sufficiently energized to close said switch, thus supplying the armature of the motor with current at two hundred and twenty volts through the resistance $R^3$, it being noted that said flow of current takes place from the positive supply-main through said resistance from the upper to the center terminal of the switch $S^{11}$, through the controller C, armature A, and series field-winding F of the motor to the negative supply-main. When the counter electromotive force of the armature has risen to one hundred and eighty volts, the coil of the switch $S^{12}$ will be energized sufficiently to close the same, thus short-circuiting the resistance $R^3$ and permitting current to flow to said coil through the auxiliary contacts on the switch $S^{12}$. The coil of the switch $S^{13}$ will likewise be energized, thus closing said latter switch and short-circuiting the series field-winding F. Owing to the fact that there is no segment in the set of contacts $C^2$ on the controller C corresponding to the finger $c^9$, the switch $S^{14}$ will not be operated, while, on the other hand, the coil of the switch $S^{15}$ will be energized by virtue of the completion of its circuit through the finger $c^{15}$, so as to open said switch and throw the bank of resistance $r^4$ into circuit with the shunt field $f$ of the motor. Such increased field resistance will weaken the field of the motor to such an extent that the motor will run at its maximum speed. When the end of the idle or return stroke is reached, the controller C is again reversed and the above-described cycle of operations is repeated, it being noted that on the working stroke—i. e., when the contacts C' are in engagement with the fingers of the controller C—the motor is supplied with current at one hundred and ten volts with a shunt field of maximum strength. On the return stroke the motor is supplied with current at two hundred and twenty volts and has its shunt field weakened by the insertion of resistance $r^4$. If the controller D be turned to the second point, it will be seen that the opening of the switch $S^{14}$, which takes place after the short-circuiting of the series field F, will throw into circuit with the shunt field-winding that portion of the resistance $r$ which is included between the two fingers which engage segments $d'$ and $d^2$ of the controller D, thus causing the motor to operate at a higher speed than when said controller is on its first point. If the controller D is moved to its third point, it will be seen that there is no longer connection between the two fingers $d^6$, while, on the other hand, the two fingers $d^7$ are electrically connected. By this means one end of each of the coils upon the switches $S^{11}$ and $S^{12}$ is connected to one terminal of the armature of the motor, while the opposite ends of said coils are connected to the other armature-terminal, with the result that said coils will be excited by the counter electromotive force of the armature.

As above described, the switches $S^{11}$ and $S^{12}$ are adjusted to close when the voltages applied to their coils are ninety and one hundred and eighty volts, respectively. Consequently when the fingers of the controller C engage the segments $C'$ the switches $S^9$ and $S^{10}$ are successively closed, thus supplying the motor with current at one hundred and ten volts. Immediately thereafter switches $S^{11}$ and $S^{12}$ are operated so as to supply current at two hundred and twenty volts, and this action is followed by the short-circuiting of the series field, as in the first case. A further increase of the speed of the motor on its working stroke is secured by moving the drum of the controller D to other points beyond this third point, so that more of the bank of resistance $r$ is thrown into circuit with the shunt field-winding $f$ when the switch $S^{14}$ is opened, thereby weakening said field and correspondingly speeding up the motor.

While I have shown but two switches for controlling the resistance $R^2$ and $R^3$, it will be understood that, if desired, I may increase this number without in any way departing from the principles of my invention and may also vary the number of switches for throwing resistance into circuit with the shunt field-winding of the motor.

It will be noted that the resistance $r^4$ may, if desired, be made adjustable, so that the speed of the motor may be varied for both directions of rotation of the armature, as indicated, for example, in connection with the arrangement of my system illustrated in Figs. 1 and 2.

Referring to Fig. 4, it will be seen that I have shown my improved system of control as applied to the operation of a shunt-wound motor supplied with current at any of six voltages delivered from the four wires of a multivoltage system. With such an arrangement of parts I vary the speed of the motor by supplying its armature with current at the several voltages and also, if desired, by varying a relatively small amount of resistance in the shunt field-circuit.

Fig. 5 indicates diagrammatically a multi-voltage system in common use in which there are three generating-armatures X, X', and $X^2$, supplying lines $x$, $x'$, $x^2$, and $x^3$. If it be assumed that the armature X generates current at forty-four volts, X' current at sixty-six volts, $X^2$ current at one hundred and four volts, it is obvious the following voltages will be available: between the lines $x$ and $x'$, forty-four volts; between the lines $x'$ and $x^2$, sixty-six volts; between the lines $x$ and $x^2$, one hundred and ten volts; between the lines $x^2$ and $x^3$, one hundred and forty volts; between the lines $x'$ and $x^3$, two hundred and six volts; between the lines $x$ and $x^3$, two hundred and fifty volts.

In Fig. 4, $Q^2$ is a four-pole main switch inserted in the supply-lines $x$, $x'$, $x^2$, and $x^3$. As before, C indicates a controller operated, preferably, by the driven machine, and for the combination described this controller is provided, in addition to the main contact-segments and fingers hitherto noted, with two fingers $c^{16}$ and $c^{17}$, having two pairs of electrically-connected contact-segments suitably placed upon the same, one of these pairs being included in the set of contacts $C'$ and the other among the contacts $C^2$. In addition there is among the set of contact-segments $C'$ a short segment having a corresponding contact-finger $c^{18}$, while on the side of the controller-drum having the segments $C^2$ is a group of segments all connected together and to the main contact-segments, which engage the fingers $c^6$ and $c^7$ and having five contact-fingers $c^{19}$ to $c^{23}$, placed on the controller, so as to respectively engage them. Similarly the contact-segment engaged by the finger $c^{18}$ is connected to the segments engaged by the fingers $c^4$ and $c^6$. The armature of the motor is indicated at A and its shunt field at $f$, said field being connected between the supply-mains $x$ and $x^2$ and having in series with it an adjustable resistance $r^5$. $S^{20}$ to $S^{25}$, inclusive, are double-pole double-acting automatic switches each provided with a magnet-coil $s^{20}$, by which it is actuated, and each having pivoted blades $s^{21}$ and $s^{22}$ yoked to a bar connected to the armature of its operating magnet-coil $s^{20}$. Under normal conditions with the coil not excited the switch-blade $s^{21}$ is retained in engagement with the terminals $s^{23}$ and the blade $s^{22}$ in engagement with the terminal $s^{24}$, while when the magnet is excited both blades are simultaneously turned on their supporting-pivots, so as to break contact with the terminals $s^{23}$ and $s^{24}$ and respectively make contact with the terminals $s^{25}$ and $s^{26}$. The pivoted blades $s^{21}$ of each of the six switches when considered in connection with the contacts $s^{25}$ is designed to connect the contact-finger $c^4$ of the controller C to certain of the supply-mains, while the switch-blades $s^{22}$, in connection with the terminals $s^{26}$, are designed to connect the contact-fingers $c^7$ with certain others of said supply-mains. When the coil of the switch $S^{20}$ is excited, the contact-finger $c^4$ of the controller C is connected to the supply-line $x$ through the various switches, while the contact-finger $c^7$ is simultaneously connected to the line $x'$, thus supplying to the armature of the motor current at the voltage which exists between the lines $x$ and $x'$. When switch $S^{21}$ is closed, the movement of the blades $s^{21}$ and $s^{22}$ upon their pivots breaks connection with the terminals $s^{23}$ and $s^{24}$ of switch $S^{20}$ and causes them to engage with the contacts $s^{25}$ and $s^{26}$ of said switches $S^{21}$, thus connecting the contact-fingers $c^4$ and $c^6$ of the controller C with the contact-mains $x'$ and $x^2$, whereby current at the next higher voltage is supplied to the armature. In a similar manner each succeeding switch as it operates breaks the connections established by the preceding switch and connects the contact-fingers $c^4$ and $c^6$ with the supply-mains, giving current at regularly-increasing voltages. One end of the coil $s^{20}$ of the switch $S^{20}$ is connected to the supply-main $x$, while the other end is connected to contact-fingers $c^{16}$ of the controller C. There is a second contact-finger $c^{17}$ connected to the supply-main $x'$, and these two fingers are so placed on the controller as to engage under operating conditions with one of the two pairs of electrically-connected segments above noted, thus energizing the coil of said switch $S^{20}$. One end of each of the coils of the switches $S^{21}$ and $S^{25}$ is connected to one terminal of the armature of the motor, while the other end of each of the said coils is connected, respectively, to the contact-fingers $c^{19}$, $c^{20}$, to $c^{23}$, placed on the controller C so as to engage the corresponding contact-segments which, as before noted, are in connection with the segments engaged by the fingers $c^6$ and $c^7$.

In addition to the above-mentioned controller C there is a second controller E, having a drum operative at will, which is shown as developed in Fig. 4 and provided with six electrically-connected segments (designated by the reference-letter $e$.) The longest of these segments has a corresponding contact-finger $e'$ in electrical connection with the contact-finger $c^{18}$ on the controller C, and there are on the controller E five other contact-fingers $e^2$, $e^3$, to $e^6$, electrically connected to the fingers $c^{19}$, $c^{20}$, to $c^{23}$ of the controller and so placed as to respectively engage the various segments $e$ when the controller E is operated. With such an arrangement of apparatus and connections and with the barrel of the controller C turned so as to bring its contacts C' into engagement with the various contact-fingers and the barrel of the controller E turned so as to bring all of its contact-fingers into engagement with their respective segments the coils of each of the five switches $S^{21}$ to $S^{25}$, inclusive, will be connected across the terminals of the armature A of the motor, so that they will be excited by the counter electromotive force thereof.

With the voltages noted between the various supply-mains the coil of the switch $S^{21}$ will be adjusted to operate its switch when the counter electromotive force of the armature has reached, say, eighty-five per cent. of forty-four volts. Similarly switch $S^{22}$ is adjusted to close when the counter electromotive force of the armature is increased to eighty-five per cent. of sixty-six volts, and so on, it being seen that the armature of the motor will have its speed gradually accelerated as the switches successively close and apply to it current at the various progressively-increased voltages.

Among the set of contacts $C^2$ of the controller C there is no segment corresponding to the contact-finger $c^{18}$, so that the controller E will be rendered inoperative when the barrel of the controller C has been turned so as to bring the contact-segments $C^2$ into operation. It will be noted, however, that when said set of segments $C^2$ is in use the contact-fingers $c^{19}$, $c^{20}$, to $c^{23}$ will engage certain segments, so that under these conditions all of the switches $S^{21}$ to $S^{25}$ will be successively operated so as to accelerate the motor to its highest speed.

The switch $S^{20}$ is provided with a second magnetic coil $s^{28}$ and has a plunger connected to its blade $s^{21}$. Said blade is constructed to complete a circuit between two contacts $s^{29}$ and $s^{30}$, connected, respectively, to the terminals A of the armature by lines of which one is in series with the bank of resistance R. The coil $s^{28}$ is connected directly across the terminals of the armature, so that it is constantly excited by the counter electromotive force of said armature so long as this latter is in motion. With such connections it will be noted that as long as the switch $S^{20}$ is in position to bridge the contacts $s^{29}$ and $s^{30}$ the armature of the motor will be short-circuited upon itself through the resistance R. The two coils of said switch $S^{20}$ are so designed that when they are both excited and with the armature of the coil $s^{20}$ in position to cause the blades $s^{21}$ and $s^{22}$, respectively, to engage the terminals $s^{25}$ and $s^{26}$ the coil $s^{28}$ will be inoperative, since the coil $s^{20}$ will exert a relatively more powerful pull on account of its armature being in a practically closed magnetic circuit, while the coil $s^{28}$ will be acting upon its armature through a relatively large air-gap. As soon, however, as coil $s^{20}$ is deënergized—as, for example, by the operation of the controller C—the coil $s^{28}$ being still excited by the counter electromotive force of the armature will at once operate the switch $S^{20}$, after which, even though coil $s^{20}$ be again excited, it will retain said switch in position to bridge the contacts $s^{29}$ and $s^{30}$ until the counter electromotive force of the armature has fallen to zero, when the coil $s^{20}$ is again free to act.

Considering the above-described combination of apparatus through one complete cycle of operations with the controller E upon its second point and the resistance $r^5$ all in circuit with the shunt field of the motor, if the group of segments $C'$ of the controller C be brought into engagement with their respective fingers the coil $s^{20}$ of the switch $S^{20}$ will at once be connected across the supply-mains $x$ and $x'$, thus bringing the blades $s^{21}$ and $s^{22}$ into engagement with their respective terminals $s^{25}$ and $s^{26}$. By following the connections it will be seen that current at forty-four volts is supplied to the armature of the motor, and it will therefore start to rotate. Since the controller E is on its second point, it will be seen that the coil of the switch $S^{21}$ will be excited and will close said switch when the counter electromotive force of the armature has risen to eighty-five per cent. of forty-four volts, thus supplying the armature with current at sixty-six volts. Since one end of each of the coils of the remaining switches is open-circuited both at the controller C and at the controller E, none of said switches will be operated, and the motor will continue to run on current at sixty-six volts. When the end of the working stroke of the machine operated is reached, the drum of the controller C will be automatically moved, so as to open circuit and among other connections the coil $s^{20}$ of the switch $S^{20}$. Since the coil $s^{28}$ is constantly excited by the counter electromotive force of the armature, it will at once operate the switch $S^{20}$, so as to bridge the contacts $s^{29}$ and $s^{30}$, while in the meantime the contact-fingers of the controller C have been brought into engagement with the set of contact-segments $C^2$. Though the coil $s^{20}$ of the switch $S^{20}$ will thus again be excited, it cannot operate said switch until the armature of the motor has been brought to a standstill— in the present instance by being short-circuited upon itself through the resistance R. As soon as this occurs the coil $s^{20}$ will operate the switch $S^{20}$ and close it, so as to supply current to the armature at forty-four volts, turning said armature in a direction the reverse of that first noted on account of the reversal of connections in the controller C. Since the contact-fingers $c^{19}$ to $c^{23}$, inclusive, are in engagement with their corresponding segments, there are complete circuits through all of the coils of the five switches $S^{21}$ to $S^{25}$, and consequently said switches will be successively operated, so as to bring the motor up to its full speed. At the end of this stroke of the machine operated the circuits of all of the switch-coils will be broken by the operation of the controller C and the coil $s^{28}$ will again act to operate the switch $S^{20}$, so as to again dissipate the energy contained in the armature and the parts attached thereto in the resistance R, after which the coil $s^{20}$ of this switch will again operate it and the above cycle of operations be repeated.

It will be understood by those skilled in the art that by changing the position of the adjustable arm of the field-resistance $f$ the field of the motor may be weakened to any desired extent and the speed of the motor thus varied. Similarly by changing the position of the drum of the controller E the speed of the motor when the set of contacts $C'$ of the controller C is in use may be varied to any desired extent to suit the work operated upon. It will be further seen that, as noted in connection with the first application of my invention, the speed of the motor may be independently varied during its operation on the idle or return stroke of the machine operated.

When it is desired to stop the motor, the switch $Q^2$ may be opened, or the controller C may be thrown to the off position, the coil $s^{28}$ acting in either case to close the armature-circuit through the resistance R, so as to quickly bring the armature to rest.

I claim as my invention—

1. The combination of an electric motor, a reversing-controller actuated thereby, with switches operatively independent of the controller for governing the application of current to the motor after said controller has been operated, substantially as described.

2. The combination of a motor, an automatic reversing-controller actuated by said motor including means for operating the same, means for accelerating the speed of the motor and means operative independently of the controller for governing the action of said accelerating means, substantially as described.

3. The combination of a motor, a reversing-controller operated thereby, a series of switches, with connections between said apparatus so arranged that operation of the controller causes the switches to be successively operated, substantially as described.

4. The combination of a motor, a series of switches having connections to the motor such that their successive operation will cause the speed of the motor to be accelerated, and an automatic reversing-controller actuated by said motor, substantially as described.

5. The combination of a motor, a series of automatic switches and an automatic reversing-controller connected to cause actuation of said switches, said controller being operated by said motor, with means for governing the action of said switches and thereby governing the action of the motor, substantially as described.

6. The combination of a motor with a reversing-controller, a series of switches, means for automatically operating the controller and connections between said apparatus, with means for causing certain circuits to be broken at the switches before said circuits are broken at the controller, substantially as described.

7. The combination of a motor, a reversing-controller having main and auxiliary contacts, a series of switches connected to the controller and to the motor, with means connected to said auxiliary contacts for operating the switches, said contacts being placed to cause the switches to open before their circuit is broken at the main contacts of the controller, substantially as described.

8. The combination of a motor, a reversing-controller, automatic switches connected so that their operation causes the speed of the motor to be accelerated and automatic means for causing the motor to act as a generator and thereby stop the revolution of the motor-armature, substantially as described.

9. The combination of a motor, a reversing-controller having two sets of contacts, automatic switches connected so that their operation causes the speed of the motor to be accelerated and means for automatically stopping the revolution of the motor, said means including auxiliary contacts placed intermediate of said two sets of contacts, substantially as described.

10. The combination of a motor, an automatic reversing-controller actuated by said motor, a series of switches, means for causing the operation of one of the switches from the controller and means independent of the controller for governing the action of the other switches, substantially as described.

11. The combination of a motor, an automatic reversing-controller periodically actuated therefrom and electromagnetic switches connected to govern the speed of the motor, the coils on certain of the switches being wound to cause operation of said switches when different voltages are applied to said coils, substantially as described.

12. In a controlling system the combination of a motor, an automatic reversing-controller and automatically-acting means for absorbing the energy due to the motion of the armature and its attached mechanism after each operation of the controller, substantially as described.

13. In a controlling system, the combination of a motor, an automatic reversing-controller, a bank of resistance, an automatic switch for placing said resistance in circuit with the shunt field-winding of the motor and means for causing different amounts of said resistance to be in circuit with said winding after successive reversals of said motor, substantially as described.

14. In a controlling system, the combination of a motor, an automatic reversing-controller and means operated independently of said controller for causing the speed of the motor to be different after successive reversals of said motor, substantially as described.

15. In a controlling system, the combination of a motor, a reversing-controller, a bank of resistance and an automatically-acting switch mechanically independent of the controller for throwing said resistance in circuit with the field of the motor for causing the speed of said motor to be different after successive reversals, substantially as described.

16. In a controlling system, the combination of a motor, an automatic reversing-controller and adjustable means for causing the speed of the motor to be different after successive reversals thereof, substantially as described.

17. In a controlling system, the combination of a motor, an automatic reversing-controller, a series of automatic magnetic switches, means controlled by said switches for limiting the speed of the motor, with contacts on the controller for causing certain only of said switches to act after alternate reversals of the motor, substantially as described.

18. The combination of a motor, mechanism operated thereby, a device operated by said mechanism for periodically reversing the motor and automatically-acting means mechanically independent of said reversing device for accelerating the motor after each reversal thereof, substantially as described.

19. The combination in a controlling system of a motor, means for automatically accelerating the same to a predetermined speed, a reversing-controller including means for causing the operation of said accelerating means after said controller is operated, with means including operating mechanism mechanically independent of the controller for causing the speed of the motor to be different after its reversal from its speed before such reversal, substantially as described.

20. In a controlling system, the combination of a motor, means for causing the motor to operate at a predetermined speed, an automatic reversing-controller, with adjustable means for causing the motor to operate after its reversal at a speed different from that before its reversal, substantially as described.

21. In a controlling system, the combination of a motor, adjustable means for causing said motor to operate at any predetermined speed, an automatic reversing-controller and means for causing the motor to operate after its reversal at a speed different from its speed before such reversal, substantially as described.

22. In a controlling system, the combination of a motor, adjustable means for causing said motor to operate at any predetermined speed, an automatic reversing-controller and adjustable means for causing the motor to operate after its reversal at a speed different from the speed before such reversal, substantially as described.

23. The combination in a controlling system of a motor, a switch or switches, a speed-regulating device connected to be placed in circuit with the motor by operation of said switch or switches, an automatic reversing-controller and means for causing the motor to operate independently of said speed-regulating device after alternate reversals of its direction of rotation, substantially as described.

24. In a controlling system, the combination of a motor, a speed-regulating device therefor, an automatic switch or switches for placing said device in circuit with the motor, and an automatic reversing-controller mechanically independent of the switch and including means for causing said switch or switches to be operated after alternate reversals of the motor, substantially as described.

25. In a controlling system, the combination of a motor, an automatic reversing-controller connected thereto, with a current-limiting device and automatic mechanism for throwing said device into circuit with the armature of the motor after current has been cut off therefrom and before the application of current for driving it in the reverse direction, substantially as described.

26. In a controlling system, the combination of a motor, an automatic reversing-controller connected thereto, with a current-limiting device for the motor and automatic mechanism for throwing said device into operation after the cutting off of current to the motor and before the application of current for driving said motor in a reverse direction, substantially as described.

27. In a controlling system, the combination of a motor, means for starting and accelerating the same, an automatic reversing-controller connected to the motor and to said means, with a current-limiting device, and automatic mechanism for throwing said device into operation after current has been cut off and before the motor is started in the reverse direction, substantially as described.

28. In a controlling system, the combination of a motor, an automatic reversing-controller connected thereto, a bank of resistance and an automatic switch connected to throw said resistance into circuit with the motor after current has been cut off therefrom and before said motor is started in a reverse direction, substantially as described.

29. In a controlling system, the combination of a motor, a bank of resistance, means for completing the circuit through said motor and the resistance, means for automatically cutting out said resistance, means for automatically varying the strength of the field of the motor while said motor is operating in a given direction and means for automatically reversing the motor, substantially as described.

30. In a controlling system, the combination of a motor, a bank of resistance, means for completing the circuit through said motor and the resistance, means for automatically cutting out said resistance, means for varying the strength of the field of the motor and means for automatically reversing the motor while said motor is operating in a given direction, said reversing means including connections for automatically inserting and cutting out said resistance, substantially as described.

31. In a controlling system, the combination of a motor, means for varying the strength of the field thereof, a device for causing operation of said means, and an automatic reversing-controller, the same including connections for causing the field-varying device to operate after each operation of the controller, substantially as described.

32. In a controlling system, the combination of a motor, a bank of resistance, a switch for inserting said resistance in circuit with the motor-field winding, and a reversing-controller mechanically independent of said switch and including connections for causing the operation of the switch after alternate operations of said controller, substantially as described.

33. In a controlling system, the combination of a compound-wound motor, a bank of resistance for the shunt field-winding thereof, with means for automatically cutting out the series field-winding, means for varying the amount of said bank of resistance in circuit with the shunt-winding and means for automatically reversing the motor, substantially as described.

34. In a controlling system, the combination of a compound-wound motor, means for varying the strength of the shunt field thereof, with means for automatically short-circuiting the series field-winding and means for automatically reversing the motor, substantially as described.

35. In a controlling system, the combination of a compound-wound motor, an automatic reversing-controller therefor, a switch for cutting out the series winding of the motor, a bank of resistance, a second switch for causing the insertion of said resistance in circuit with the shunt-winding of the motor and means for causing said switches to operate successively, substantially as described.

36. In a controlling system, the combination of a compound-wound motor, an automatic reversing-controller therefor, a bank of resistance, a switch for cutting said resistance out of circuit with the motor, a second switch for cutting out the series winding of the motor, a second bank of resistance, a third switch for causing the insertion of said second bank of resistance in circuit with the shunt-winding of the motor and means for causing operation of said switches in a predetermined order, substantially as described.

In testimony whereof I have signed my name to this specification in the presence of two subscribing witnesses.

ARTHUR C. EASTWOOD.

Witnesses:
C. W. COMSTOCK,
J. E. WELLMAN.